United States Patent [19]

Maehara

[11] 4,037,689
[45] July 26, 1977

[54] AUDIBLE ALARM SOUNDING TYPE PAD CLIP DEVICE FOR DISC BRAKE

[75] Inventor: Toshifumi Maehara, Iwatsuki, Japan

[73] Assignee: Akebono Brake Industry Company, Ltd., Tokyo, Japan

[21] Appl. No.: 651,629

[22] Filed: Jan. 23, 1976

[30] Foreign Application Priority Data

July 5, 1975   Japan .................. 50-94106[U]

[51] Int. Cl.² ................................ F16D 66/02
[52] U.S. Cl. .................................... 188/1 A
[58] Field of Search .......................... 188/1 A

[56] References Cited

U.S. PATENT DOCUMENTS

| 3,141,524 | 7/1964 | Mishler | 188/1 A |
| 3,199,631 | 8/1965 | Blankemeyer | 188/1 A |
| 3,363,232 | 1/1968 | Mizsak | 188/1 A UX |

FOREIGN PATENT DOCUMENTS 44-19048  11/1963  Japan ................. 188/1 A

Primary Examiner—Duane A. Reger
Attorney, Agent, or Firm—Armstrong, Nikaido & Marmelstein

[57] ABSTRACT

A pad clip device is provided comprising a U-shaped resilient spring, one portion of which is formed as a loop attached to the backing plate and having another portion extending beyond the plate to indicate the wear of the brake lining.

5 Claims, 5 Drawing Figures

AUDIBLE ALARM SOUNDING TYPE PAD CLIP DEVICE FOR DISC BRAKE

SUMMARY OF THE INVENTION

This invention contemplates the provision in a disc brake of a pad clip device which serves to eliminates play between the braking metal plate of each friction pad of the brake and a support arranged to slidably guide the friction pad thereon and which also serves to sound the alarm by coming into contact with the disc when the lining of the friction pad has worn away to such an extent that such wear is no longer allowable. The pad clip device is composed of a long U-shaped resilient material with one end thereof attached to the backing metal plate of the friction pad and with the base portion of the U shape stretching out sideways to form a loop while the other end is extended to a point corresponding to the allowable limit of wear of the friction pad lining.

BRIEF DESCRIPTION OF DRAWINGS

The accompanying drawings illustrate a preferred embodiment of this invention.

DETAILED DESCRIPTION OF THE INVENTION:

This invention relates to a pad clip device which is provided in a disc brake and is disposed between the backing metal plate of each friction pad and a support to eliminate play between the plate and the support which slidably guides the friction pad.

It is an object of this invention to provide a friction pad which is not only free from rattling play but also sounds an alarm with the end of the pad clip device provided therein coming into contact with one disc when the lining of the pad has worn away to an allowable limit.

Figure 1:
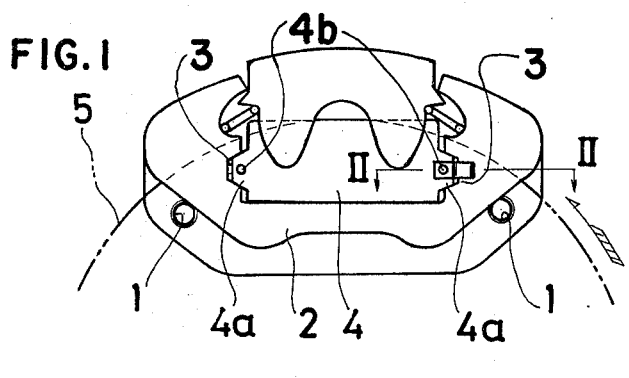
FIG. 1 is a front view of a disc brake.

In the disc brake in general, a support 2 is secured to the structure of a vehicle with bolts screwed in screw holes 1 as illustrated in FIG. 1; protrudent portions 4A of a backing metal plate 4 of each friction pad are loosely fitted in the right and left guide grooves 3 provided in the support 2 and are freely slidable in the direction perpendicular to the paper surface as viewed in the drawing; two friction pads are disposed on both sides of a disc 5 which is linked to a wheel; and the brake is applied to the wheel through the disc by pressing the friction pads against the disc by means of a caliper member and a cylinder respectively.

Since the backing metal plate 4 of each friction pad loosely engages with the guide grooves 3 of the support through the protrudent portions 4a, the plate 4 rattles and produces noises as the structure of the vehicle vibrates or when a shock results from braking. To prevent such rattling, therefore, it has been proposed to insert a resilient pad clip in between the guide grooves 3 and the protrudent portions 4a. With such arrangement, the rattling of the backing metal plate of the friction pad can be prevented by the resilience of the pad clip.

The present invention is directed to the utilization of the pad clip in such a way as to cause it to produce an audible alarm when the lining of the friction pad has worn away to the extent of an allowable limit.

It is another object of this invention to provide a pad clip device which produces a loud alarm sound which is sufficiently loud to be audible at the driver seat, in the case of an automobile or the like, by coming into contact with the disc of the disc brake when the lining of the friction pad had worn away so that the driver can be informed of the wear of the lining of the friction pad to an allowable limit.

It is still another object of this invention to provide a pad clip device which can be readily and precisely installed in the conventional disc brakes.

Figure 2:
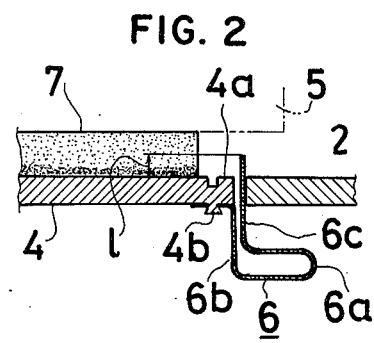
FIG. 2 is a sectional view across a line II—II indicated in FIG. 1.
Figure 4:
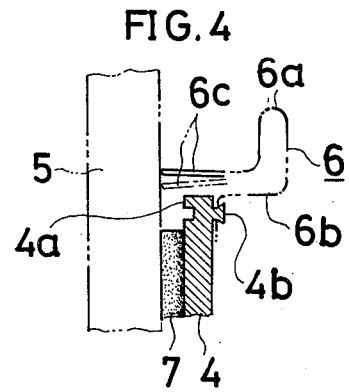
FIG. 4 schematically illustrates the oscillating condition of one end 6c of a clip.

The pad clip device which meets the requirements for attaining the above stated objects of this invention is basically composed of a long U-shaped resilient material which is formed to have two side portions. One side portion is attached to the backing metal plate of the friction pad; the base portion of the pad clip stretches out to form a loop; while the other side portion is resiliently in contact with the guiding face of the support with the end of this side portion extending up to a point coinciding with the allowable limit of wear of the lining of the friction pad. The loop in the base portion of the U shape can be formed into any shapes as long as it serves to give a sufficient vibrating latitude to the latter side portion which comes into contact with the disc when the lining of the friction pad has worn away to an allowable limit. The loop may be formed to stretch out either toward the side of the friction pad (the direction of the disc rotation) or toward the side of the support (the reverse direction of the disc rotation) as shown in FIG. 2 and 4, or it may be formed to stretch out on both sides. However, in order to give an ample latitude to the latter side portion to insure the sufficient vibration thereof, it is preferable to make the loop portion stretch out at least on the support side.

As for the method of attaching one side portion of the long U-shaped resilient material to the backing metal plate of the friction pad, it may be selected from various methods such as welding, screwing, calking etc. as desired. However, for reasons described hereinafter, it is more advantageous to carry out the work as follows: Bore a hole in the side portion of the long U-shaped resilient material beforehand. Provide the backing metal plate with a short protrusion which is formed by a suitable process such as extrusion or the like at a position where the side portion of the resilient material is to be attached. Then, push the protrusion of the backing metal plate through the hole of the side portion and secure it thereto by calking.

Figure 3:
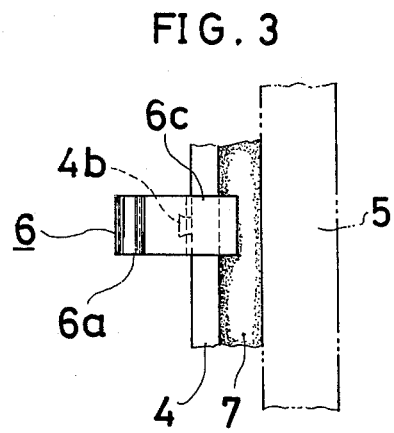
FIG. 3 is a view of the side indicated by an arrow in FIG. 2.

Further details and advantages of this invention will become apparent from the following description, reference being had more particularly to the drawings:

As illustrated in FIG. 2, 3 and 4, the pad clip 6 is composed of a resilient long U-shaped material made from a resilient plate spring. The base portion 6c of the long U-shape is bent perpendicularly toward the reverse direction of rotation of the disc(5) (toward the support 2), i.e. the arrow direction in FIG. 1. One side portion 6b of the long U-shape is provided with a hole. A protrusion 4b which is formed to stick out like a short stud from a backing metal plate 4 of a friction pad is inserted through the hole. After insertion, the protrusion 4b is calked in a shape of a rivet head to secure the pad clip 6 to the backing metal plate 4. The other side portion 6c of the long U-shape of the clip 6 is arranged to extend to have its end located at a point coinciding with the thickness l of the lining 7 of the pad which represents the allowable limit of wear of the lining.

Figure 5:
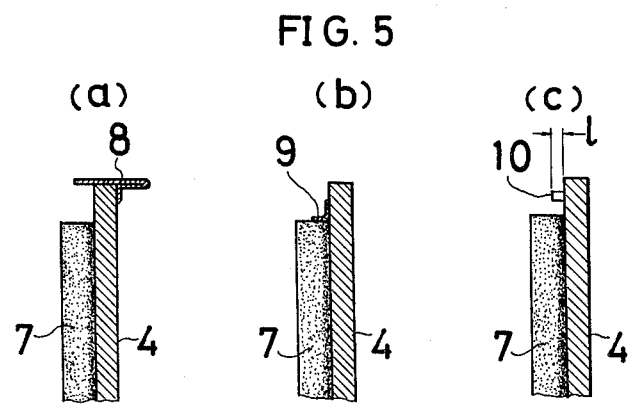
FIG. 5a through c are sectional views similar to FIG. 2 illustrating conventional examples respectively.

With the pad clip 6 arranged as described above, the rattling and noise between the support 2 and the backing metal plate 4 of the friction pad is prevented by the resilient contact of the one side portion 6c of the clip 6 with the support 2. In addition to that, the end of the side portion 6c comes into contact with the disc 5 to sound the alarm when the lining 7 of the friction pad wears out. In other words, the lining 7 gradually wears away and, when one side portion 6c of the clip comes to contact the disc 5, the end of the side portion 6c is pushed in downward, as viewed in FIG. 2, by the disc 5. By this, the contact resilience developed between the disc and the side portion 6c of the clip increases as the wear of the lining further advances. The side portion 6c of the clip is slightly moved in the lateral direction by a frictional force between the disc 5 and the end of the side portion 6c as indicated by a chain line in FIG. 4. The resilient force of the end of the side portion 6c to push the surface of the disc is lessened by this lateral movement. This results in the reduction of the frictional force and this causes the end of the side portion 6c to be brought back into the original solid line position by the resilience of the clip. This motion is rapidly repeated to produce a loud sound which is sufficiently audible at the driver seat in the case of an automobile. In this instance, it is effective to make the side portion 6c of the clip long and to form the base portion of the clip into a loop shape stretching out sideways. The vibration as illustrated in FIG. 4 can be produced by such arrangement. This will fully be understood by reference to the following description of the conventional examples when considered in connection with FIG. 5a, b and c:

FIG. 5a illustrates an example wherein a resilient piece 8 which is formed without having a loop in the base portion of the clip 6 is attached to the backing metal plate; FIG. 5b an example wherein a short resilient piece 9 is riveted to the backing metal plate 4; and FIG. 5c another example wherein a protrusion 10 of height l is provided on the inner face of the backing metal plate 4. In all of these comparison examples, the resilient pieces 8 and 9 and the protrusion 10 are arranged to come into contact with the disc when the lining of the friction pad wears away to an allowable limit of wear. However, the latitude allowed for vibration is extremely little in all of these examples. Therefore, none of them are capable of sounding the alarm.

Whereas in the embodiment of this invention illustrated in FIG. 2 through 4, once the side portion 6c of the pad clip has come into contact with the disc 5, the portion 6c resiliently contacts the disc to produce an audible sound in a state of being somewhat displaced toward the downside (in FIG. 4) every time the brake is applied. When the wear of the lining of the friction pad has further advanced, the side portion 6c comes to remain in contact with the disc, the portion being pushed forward by the resilient force even under a non-braking condition so that it produces an alarming sound even under a non-braking condition while the automobile is in operation. This enhances the effect of this invented device.

For fitting a pad clip 6 to a backing metal plate 4, an ordinary riveting method tends to result in a fitting error due to variance of the rivet diameter while a welding method would require the use of special jig. Thus such ordinary methods for fitting the clip 6 is disadvantageous because of the longer time required for positioning. However, with the pad clip device arranged in accordance with this invention as illustrated in FIG. 2, the inner side (upper side as viewed in FIG. 2) of the backing metal plate 4 is pushed downward to make the short stud-like protrusion 4b stick out through the hole of the clip 6; then the clip is secured in position by calking the protrusion. Such work can be accomplished rapidly and precisely by means of a press.

As described in the foregoing, the pad clip device of this invention is prepared using a pad clip which includes a loop formed in the base portion to provide a greater latitude for the vibration of the side portion 6c thereof. Therefore, the pad clip device not only eliminates the rattling of the backing metal plate on the support but also is capable of producing a sufficiently loud alarm sound when the lining of the friction pad has worn away to an allowable limit. The invented pad clip device can be advantageously applied as it is also to the conventional disc brakes.

What is claimed is:

1. An audible alarm sounding pad clip device for disc brakes consisting of a side portion comprising an elongated U-shaped resilient member is adapted to be attached to the backing metal plate of a friction pad and includes a loop formed in the base portion of said resilient member and another side portion of the U-shaped member arranged to be resiliently in contact with the friction pad guiding face of a support with the end of the same side portion extending to a point coinciding with an allowable limit of wear of the lining of said friction pad.

2. A device as defined in claim 1 wherein said base portion of the long U-shaped resilient member is bent sideways toward said support.

3. A device as defined in claim 1 wherein said other side portion which is resiliently in contact with said support extends in a long straight form from the backing metal plate of the friction pad on the side opposite to the lining of the friction pad and continues on the loop shaped base portion of said resilient member.

4. A device as defined in claim 1, wherein a hole is provided in the end of said one side portion of the long U-shaped resilient member to form a hook portion there; while a protrusion which is arranged to stick out from the backing metal plate is disposed through said hole; and the protrusion is calked into a shape of a rivet head.

5. An audible alarm sounding pad clip which is composed of a long U-shaped resilient material comprising one side portion 6b to be attached to the backing metal plate 4 of the friction pad; another long-legged side portion 6c which is resiliently in contact with said guiding face of the support with the end of the side portion 6c extending to a point coinciding with an allowable limit of wear of the lining of said friction pad; and a base portion 6a which is bent sideways in the outer direction toward the support.

* * * * *